United States Patent
Ogata et al.

(10) Patent No.: US 7,982,019 B2
(45) Date of Patent: Jul. 19, 2011

(54) METHOD FOR PRODUCING DRY ORGANIC PIGMENT

(75) Inventors: Akihiro Ogata, Kashima (JP); Nagatoshi Kobayashi, Kashima (JP)

(73) Assignee: DIC Corporation, Tokyo (JP)

( * ) Notice: Subject to any disclaimer, the term of this patent is extended or adjusted under 35 U.S.C. 154(b) by 363 days.

(21) Appl. No.: 12/303,882

(22) PCT Filed: Oct. 16, 2007

(86) PCT No.: PCT/JP2007/070155
§ 371 (c)(1), (2), (4) Date: Dec. 8, 2008

(87) PCT Pub. No.: WO2008/062617
PCT Pub. Date: May 29, 2008

(65) Prior Publication Data
US 2010/0249391 A1    Sep. 30, 2010

(30) Foreign Application Priority Data

Nov. 21, 2006 (JP) .................................. 2006-314162

(51) Int. Cl.
C09B 67/04 (2006.01)
C09B 67/06 (2006.01)
C09B 67/22 (2006.01)

(52) U.S. Cl. ........................................ 534/887; 106/496

(58) Field of Classification Search .................. None
See application file for complete search history.

(56) References Cited

U.S. PATENT DOCUMENTS

| 4,601,759 A | 7/1986 | Furubayashi et al. |
| 5,622,555 A | 4/1997 | Muramatsu et al. |
| 6,397,490 B1 | 6/2002 | Inoki et al. |
| 7,780,775 B2 * | 8/2010 | Healy et al. ............... 106/31.73 |
| 2003/0188664 A1 | 10/2003 | Anantharaman et al. |

FOREIGN PATENT DOCUMENTS

| GB | 807089 A | 1/1959 |
| JP | 59-191765 A | 10/1984 |
| JP | 07-278458 A | 10/1995 |
| JP | 2001-41652 A | 2/2001 |
| JP | 2004-69115 A | 3/2004 |
| JP | 2006-063306 | * 3/2006 |

OTHER PUBLICATIONS

Machine Translation of JP 2006-063306, Mar. 2006.*
Supplementary European Search Report dated Mar. 29, 2011, issued for the corresponding European Patent Application No. 07 82 9889.0.

* cited by examiner

*Primary Examiner* — Fiona T Powers
(74) *Attorney, Agent, or Firm* — Edwards Angell Palmer & Dodge LLP (57) ABSTRACT

The present invention provides a method for producing dry organic pigment, comprising the successive steps of, in this order: a first step wherein a wet organic pigment is obtained by drying an organic pigment presscake at 70 to 150° C. to a moisture content of 5 to 30%, and a second step wherein a dry organic pigment is obtained by pulverizing and drying the wet organic pigment at a temperature that is higher than the temperature employed in the first step but lower than the decomposition temperature of the organic pigment. The method for producing dry organic pigment enables the dry organic pigment to be obtained with superior productivity while consuming less energy than conventional methods.

4 Claims, 3 Drawing Sheets

METHOD FOR PRODUCING DRY ORGANIC PIGMENT

CROSS-REFERENCE TO PRIOR APPLICATION

This is the U.S. National Phase Application under 35 U.S.C. §371 of International Patent Application No. PCT/JP2007/070155 filed Oct. 16, 2007, which claims the benefit of Japanese Patent Application No. 2006-314162 filed Nov. 21, 2006, both of which are incorporated by reference herein. The International Application was published in Japanese on May 29, 2008 as WO2008/062617 A1 under PCT Article 21(2).

TECHNICAL FIELD

The present invention relates to a method for producing a dry organic pigment that enables dry organic pigment to be obtained with superior productivity while consuming less energy than conventional methods.

BACKGROUND ART

Organic pigments are required to be superior in terms of hue, hiding power, dispersibility, fluidity, solvent resistance, light resistance, weather resistance, heat resistance, water resistance and the like during use. Various treatments for obtaining pigments are carried out during or after synthesizing crude pigments to obtain a desired pigment, and the resulting pigments are used in various forms such as dry pigment, presscake or intermediates thereof.

Although various methods are used to produce dry organic pigments according to their synthesis method or finishing treatment, these methods can be broadly classified into those that go through finishing treatment accompanied by contact with organic solvent or water followed by filtration to obtain a solid in a wet state (referred to as a presscake or pressed cake and hereinafter to be simply referred to as a presscake) and drying. This same method is generally used to produce azo pigments, phthalocyanine pigments, quinacridone pigments and diketopyrrolopyrrole pigments.

For example, since azo pigments in the manner of soluble azo pigments or insoluble pigments normally undergo a coupling reaction in water, the form of the product after the reaction is an aqueous pigment suspension. This aqueous pigment suspension is then aged to carry out finishing treatment and then filtered for use as a colorant in the form of a presscake or in the form of dry granules or powder by further drying and pulverizing the presscake. The dried azo pigment is substantially free of water, thereby offering the advantages of not requiring management in the form of prevention of bacterial growth or preventing of freezing and the like and enabling lower transport costs per unit weight as compared with wet azo pigment.

Known examples of a method for obtaining such a dry azo pigment consist of drying a presscake as described above with a hot air heating type of drying apparatus in the manner of a box-type drying apparatus or air-permeable belt drying apparatus, followed by pulverizing to a desired particle diameter. However, although these methods are able to dry azo pigment to a moisture content of about 10% in a comparatively short period of time while consuming a small amount of energy, when drying is continued in an attempt to further reduce the moisture content to less than 2%, much more time and energy are required than drying to a moisture content of about 10%, thus resulting in the disadvantages of a long total drying time and considerable energy consumption.

Patent Document 1 discloses a method for drying an article to be dried with a spray drying apparatus so that the temperature of the article to be dried is 20 to 50° C. Since a spray drying apparatus rapidly dries from a state having a high moisture content to a moisture content of less than 2%, it has the disadvantage of consuming more energy than a hot air heating type of drying apparatus.

All of the examples of the prior art described above use a single drying apparatus to obtain a dry azo pigment by drying a presscake or slurry all at once.

In contrast, Patent Document 2 proposes a drying method comprising combining two different types of dryers and applying stepwise thermal hysteresis to an article to be dried. In this Patent Document 2, for example, a pigment is dried while pulverizing at a high temperature for a short period of time in a first step followed by further drying the dry pigment obtained in the first step in a second step at a lower temperature and for a longer amount of time than in the first step. In this method, a considerable amount of energy is consumed in the first step since the pigment is dried at a comparatively high temperature, and the pigment is dried at a lower temperature for a longer period of time than in the first step in the second step, thereby again resulting in the disadvantages of a long total drying time and consumption of a large amount of energy.

In the end, all of these methods of the prior art have the disadvantages of a long total drying time and consumption of a large amount of energy.

Patent Document 1: Japanese Unexamined Patent Application, First Publication No. S59-191765

Patent Document 2: Japanese Unexamined Patent Application, First Publication No. H7-278458

DISCLOSURE OF THE INVENTION

Problems to be Solved by the Invention

An object of the present invention is to provide a method for producing dry organic pigment by applying stepwise thermal hysteresis to an article to be dried, which consumes less energy and has superior productivity to conventional methods by applying stepwise thermal hysteresis to an article to be dried.

Means for Solving the Problems

The inventors of the present invention found that, in a method for drying by applying stepwise thermal hysteresis to an article to be dried, by applying the reverse approach of completing initial drying at a comparatively low temperature while still damp dry followed by drying at a higher temperature while pulverizing, the disadvantages of the method described in Patent Document 2 can be overcome, thereby leading to completion of the present invention.

Namely, the present invention provides a method for producing dry organic pigment comprising the successive steps of, in this order: a first step wherein a wet organic pigment is obtained by drying an organic pigment presscake at 70 to 150° C. to a moisture content of 5 to 30%, and a second step wherein a dry organic pigment is obtained by pulverizing and drying the wet organic pigment at a temperature that is higher than the temperature employed in the first step but lower than the decomposition temperature of the organic pigment.

Effects of the Invention

The production method of the present invention offers the extraordinarily remarkable effects of being able to obtain dry organic pigment while consuming less energy and with superior productivity to the prior art by employing a method in which drying is carried out by applying stepwise thermal hysteresis to an article to be dried, comprising completing initial drying at a comparatively low temperature while still damp dry followed by pulverizing and drying at a higher temperature than that applied during initial drying.

| | Description of the Reference Symbols |
|---|---|
| 1 | Air-permeable belt drying apparatus |
| 2 | Air flow drying apparatus |
| 3 | Feed port |
| 4 | Band |
| 5 | Rolling extruder |
| 6 | Heat exchanger unit |
| 7 | Exhaust port |
| 8 | Air supply port |
| 9 | Housing |
| 10 | Inflow port |
| 11 | Disk-shaped rotor |
| 12 | Pulverizing rotor |
| 13 | Supply unit |
| 14 | Protruding bar |
| 15 | Projection |
| 16 | Triangular pyramid-shaped projection |
| 17 | Feed port |
| 18 | Classification unit |
| 19 | Thin plate |
| 20 | Exhaust duct |

BEST MODE FOR CARRYING OUT THE INVENTION

The following provides a detailed explanation of the present invention. In the following explanation, an organic pigment presscake, wet organic pigment and dry organic pigment are abbreviated as a presscake, wet pigment and dry pigment, respectively.

The present invention relates to a method for producing dry organic pigment comprising the successive steps of, in this order: a first step wherein a wet organic pigment is obtained by drying an organic pigment presscake at 70 to 150° C. to a moisture content of 5 to 30%, and a second step wherein a dry organic pigment is obtained by pulverizing and drying the wet organic pigment at a temperature higher than the temperature employed in the first step but lower than the decomposition temperature of the organic pigment.

The method for producing dry pigment of the present invention can be applied to the production of various types of known, commonly used dry organic pigments such as azo, phthalocyanine, quinacridone, diketopyrrolopyrrole, perylene, dioxadine, indanthrone, perinone and anthraquinone-based pigments.

Examples of azo pigments used at this time include insoluble azo pigments such as C.I. Pigment Yellow 12, 13 or 14, and soluble azo pigments such as C.I. Pigment Red 48:1, 48:2, 48:3, 52:1 or 57:1; examples of phthalocyanine pigments include copper-phthalocyanine pigments such as C.I. Pigment Blue 15:3, C.I. Pigment Blue 15:4 or C.I. Pigment Blue 15:6 and polyhalogenated copper-phthalocyanine pigments such as C.I. Pigment Green 7 or C.I. Pigment Green 36; examples of quinacridone pigments include unsubstituted quinacridone pigments such as C.I. Pigment Violet 19 and dimethyl- or dichloroquinacridone pigments such as C.I. Pigment Red 122 or C.I. Pigment Red 202; examples of diketopyrrolopyrrole pigments include C.I. Pigment Red 254; examples of perylene pigments include C.I. Pigment Violet 29 or C.I. Pigment Red 179; examples of dioxadine pigments include C.I. Pigment Violet 23, and examples of indanthrone pigments include C.I. Pigment Blue 60. Only one type of these pigments may be used, or a mixture of pigments having different color indices or crystal types may also be used.

Since these organic pigments are susceptible to the occurrence of particle aggregation and crystal growth during drying thermal hysteresis and as a result, are subject to impaired dispersibility in colored media and transparency of colored articles, the method for producing dry pigment of the present invention can be effectively applied to the production of dry azo pigments that were conventionally dried for a long period of time at a comparatively low temperature and required a considerable amount of time and energy consumption in the drying step.

Azo pigments having crystalline water in the chemical structure thereof require the number of water crystals normally used as pigment to be controlled by drying, for example, so that the hue does not change due to heating at the time of subsequent actual use. From this viewpoint, since the effect of reducing energy consumption of the production method of the present invention is particularly prominent, soluble azo pigments, which conventionally required considerable energy consumption to reduce the upper limit of moisture content to less than 2%, are more preferable. The production method of the present invention can be more effectively applied to the production of C.I. Pigment Red 48:2 or 57:1 since large differences in hue caused by differences in the number of water crystals retained in the chemical structure thereof are not permitted.

In the first step of the present invention, a presscake containing an organic pigment as described above is dried so as to become a wet pigment. A presscake refers to that which contains a solid component in the form of organic pigment and a liquid medium having water as the main component thereof. In addition, a liquid medium having water as a main component thereof refers to a liquid medium containing water only or containing 90% or more of water by mass. If the liquid medium contained in the presscake is an organic solvent only or a liquid medium having an organic solvent as a main component thereof, changes in crystals of the pigment occur easily due to drying as will be described later, thereby making this undesirable.

Moisture content in the present invention is determined from heat loss (%) as measured in accordance with Japanese Industrial Standard JIS K5101-23 entitled "Loss on Heating". In the present invention, the liquid medium contained in the presscake is presumed to consist entirely of water, and the moisture content of the liquid medium contained in the presscake is referred to as the moisture content. In addition, percentages (%) indicate percent by mass.

There are no limitations on the moisture content of the presscake for carrying out drying in the present invention, and a presscake having a moisture content of, for example, 50 to 85% can be used. More specifically, normally an azo pigment presscake having a moisture content of 55 to 80%, a phthalocyanine pigment presscake having a moisture content of 55 to 70%, a quinacridone pigment presscake having a moisture content of 55 to 85% or a diketopyrrolopyrrole presscake having a moisture content of 55 to 70% is used preferably.

Although the absolute value of the amount of energy consumed during drying varies according to the moisture content of the presscake used for drying, in the present invention, a relative decrease in the amount of energy consumed during drying can be achieved regardless of the type of organic pigment as previously described. In the case of using the same type of presscakes or presscakes having equal moisture contents, the production method of the present invention makes it possible to achieve a considerable relative decrease in the amount of energy consumed as compared with the energy consumption required for conventional drying.

The organic pigment contained in the presscake used in the present invention may be composed only of an organic pigment as previously described, or may be an organic pigment coated with various types of surface modifiers. Examples of these surface modifiers include rosins, waxes, surfactants and film-forming resins as well as various derivatives of the aforementioned organic pigments such as sulfonic acid derivatives, sulfonamide derivatives, amine derivatives or phthalimidomethyl derivatives.

In the case the azo pigment contained in the presscake used in the method of the present invention is a soluble azo pigment in the manner of C.I. Pigment Red 57:1, if a rosin selected from the group consisting of rosin consisting mainly of abietic acid, hydrogenated rosin, polymerized rosin, fumaric acid-modified rosin and maleic acid-modified rosin is also used in an arbitrary step of the production thereof, a lithographic printing ink having superior transparency and coloring strength can be obtained from the resulting dry pigment, thereby making this preferable.

The content of these surface modifiers on the basis of mass of preferably within the range of 0.01 to 50 parts per 100 parts of organic pigment.

This type of presscake can be obtained by filtering a liquid medium pigment suspension following organic pigment synthesis or after carrying out various finishing treatments, rinsing with water and repeating filtering. Rinsing and filtration may be repeated as necessary. As a result of this rinsing, surface modifier not coating the organic pigment and various impurities and so forth in the case of being contained are rinsed off, and the liquid medium is substantially replaced with water only. Thus, by adjusting the degree of pressure applied during filtration, a presscake having a desired moisture content can be obtained.

In the first step of the present invention, a presscake having, for example, a moisture content of 50 to 85% by mass is dried so as to have a moisture content of 5 to 30% by mass. In the present invention, the state of a wetted pigment having a moisture content of 5 to 30% by mass is referred to as a wet pigment. The drying temperature in the first step of the present invention for obtaining a wet pigment from the viewpoint of drying efficiency alone is a comparatively low temperature of 70 to 150° C.

A drying apparatus able to be used in the first step of the present invention is an apparatus that allows the obtaining of a pigment by drying the aforementioned presscake to a moisture content of 5 to 30% at a temperature of 70 to 150° C. Examples of such drying apparatuses that can be used include air-permeable belt drying apparatuses classified as batch type hot air drying apparatuses or continuous hot air drying apparatuses.

A batch type hot air drying apparatus refers to a drying apparatus designed to carry out drying by applying hot air by having a plurality of shelves and placing molded presscakes on the shelves as necessary. The hot air is preferably such that the air inside the apparatus is at a suitable temperature. In this apparatus, after carrying out drying until a desired moisture content is reached, the shelves are removed outside the apparatus and the presscakes are recovered from each shelf. Consequently, an apparatus in which the shelves are provided on a carriage allows the shelves to be easily removed outside the apparatus thereby facilitating recovery of pigment.

In contrast to a batch type hot air drying apparatus requiring loading of presscakes, loading of wet pigment having an arbitrary moisture content and recovery of dry pigment to be carried out each time, a continuous hot air drying apparatus is superior in that loading and recovery can be carried out continuously in a single operation.

Although this continuous hot air drying apparatus includes an air flow drying apparatus, spray drying apparatus, air-permeable belt drying apparatus and cylindrical drying apparatus, an air-permeable belt drying apparatus is used preferably in the first step of the present invention. In the case of a spray drying apparatus or cylindrical drying apparatus, the amount of energy consumption required for drying per unit mass of the presscake is extremely large, thus making their use in either the first step or second step of the present invention undesirable. Alternatively, although an air flow drying apparatus is suitable for drying a small amount of presscakes in a short amount of time, the productivity of dry pigment per unit mass of the presscake is low in comparison with an air-permeable belt drying apparatus.

Consequently, in the present invention, by combining the use of, for example, an air-permeable belt drying apparatus and air flow drying apparatus in the first and second steps in this order, wet pigment and dry pigment having an arbitrary moisture content can be obtained while consuming less energy and with higher productivity.

This air-permeable belt drying apparatus is a drying apparatus designed so that molded presscakes can be placed as necessary on a horizontally long band made to be such that a band (also referred to as an endless belt) is able to rotate by circulating in the manner of a belt conveyor, and drying can be carried out by blowing hot air on the presscakes while transporting the hot cakes through the apparatus in a hot air environment. The use of a material having air permeability allows hot air to contact the presscakes in a normal manner, but also enables hot air to contact the presscakes from below the band by passing through the band.

A horizontally long type of air-permeable belt drying apparatus is provided with a plurality of chambers so as to cover the moving band, and hot air is circulated by a plurality of fans. A presscake that has entered the first chamber at the entrance as a result of being transported by movement of the band passes beneath a plurality of chambers, and after having passed beneath the last chamber at the exit, results in the obtaining of a dry pigment having a required moisture content. The presscake in the state in the first chamber has an extremely high moisture content, and the inflow and discharge of air is preferably controlled so that the moisture content decreases the closer to the chamber nearest the exit. Since the moisture content of water vapor is lower for hot air in chambers located closer to the exit, it is also effective to circulate the hot air so as to return hot air in which the moisture content of water vapor is low to the chamber nearest the entrance. Although preheated hot air may also be taken in to ventilate the chambers, a heat exchanger may be provided in the chambers to take in outside air and heat the outside air to create hot air for use in drying the presscakes. In the case of controlling the temperature of the hot air using a heat exchanger, it is preferable to select the operating conditions of the heat exchanger by determining the relationship between the temperature of the hot air in the chambers and the operating conditions of the heat exchanger. It is particularly preferable to circulate hot air so that hot air containing discharged water vapor, or hot air from which moisture has been removed there from, is mixed with outside air and returned to the chamber closest to the entrance.

An air-permeable belt drying apparatus is suitable for drying a large volume of presscakes to a desired moisture content of 30% or less in a short period of time, and since presscakes are dried while moving on the band due to the design of this type of apparatus, controlling the band transport speed and the inflow and discharge of air in the chambers on the band offers the superior advantage of being able to tentatively and continuously load presscakes prepared for drying onto the band at the entrance side of the apparatus while also automatically discharging wet pigment or dry pigment having an intended moisture content from the exit.

Examples of this type of horizontally long type of air-permeable belt drying apparatus include the band dryer manufactured by Fuji Paudal Co., Ltd., and the band-type through dryer manufactured by Naniwa Dryer Inc.

In contrast to horizontally long types of air-permeable belt drying apparatuses, since vertical multistage belt drying apparatuses present difficulties in making fine adjustments to the hot air environment within the drying chambers, these drying apparatuses are not suitable for use in the first step of the present invention.

Although substantially varying according to the type of pigment and drying conditions, the moisture content of wet pigment to be obtained in the first step of the present invention is 5 to 30%, preferably 5 to 15% and more preferably 5 to 10% with respect to being able to reduce the total amount of energy consumed in the first and second steps. In the final moisture content is less than 5%, the amount of energy consumed by the first step increases thereby eliminating the benefit of carrying out the second step accompanying a larger amount of energy consumed per unit mass of pigment to be dried, while if the moisture content conversely exceeds 30%, the amount of energy consumed in the second step is equal to or greater than the amount of energy consumed in the first step, thus making both of these cases undesirable from the viewpoint of saving energy.

An air-permeable belt drying apparatus is sufficient for obtaining dry pigment from presscakes using this apparatus alone, and in the case of using in this manner, the presscakes are dried at a temperature of 90 to 150° C. to a moisture content of less than 2%. However, in the case of carrying out drying using this type of air-permeable belt drying apparatus alone, since differences in the moisture content of each pigment located in an adjacent chamber are smaller for pigment located in chambers closer to the exit side of the drying apparatus, the disadvantage results in which a large amount of energy is consumed to reduce the moisture content of the pigment only slightly.

Therefore, the inventors of the present invention conducted extensive studies as to how this large energy consumption can be reduced without deteriorating the quality of the finally obtained pigment. The approach to solving this problem consisted of dividing the operation for drying presscakes inherently carried out in a single stage into two stages consisting of a first step and a second step by changing drying conditions. Thus, in the first step of the present invention, even though presscakes are dried, drying is carried out such that the presscakes are dried only to a particular state of a wet pigment prior to the state of a dry pigment considered to be incomplete based on the general way of thinking of the prior art.

From the viewpoint of reducing the total amount of energy consumed in the first and second steps, after obtaining wet pigment in the first step that has been dried at 70 to 150° C. to a moisture content of 5 to 30%, is it necessary to continue drying from the first step by carrying out the second step in which dry pigment is obtained by pulverizing and drying the wet pigment at a temperature higher than the temperature employed in the first step but lower than the decomposition temperature of the pigment. In the present invention, the intended technical effects are only realized by carrying out the first and second steps consecutively in this order, and the technical effects of the present invention are not demonstrated if the first and second steps are carried out in the opposite order as in the known art.

Here, dry pigment refers to pigment in which the moisture content thereof is within the range of 0 to less than 2%. As was previously described, in the case the dry pigment is a soluble azo pigment, since the hue as a colorant changes considerably depending on the moisture content of crystalline water, it is preferable to control the moisture content to an upper limit of 1.8% in consideration of lot deviations.

In the second step of the present invention, dry pigment is obtained by pulverizing and drying the wet pigment at a temperature higher than the temperature employed in the first step but lower than the decomposition temperature of the pigment. In the present invention, since a wet pigment is obtained in the first step in which the moisture content has been reduced to a certain extent, the second step can be exclusively devoted to drying for converting the wet pigment to dry pigment. Accordingly, in comparison with the case of obtaining dry pigment from presscakes by carrying out only the second step independently, drying in the second step can be carried out with a simpler procedure while consuming less energy.

The wet pigment obtained from the drying apparatus used in the first step is continuously supplied to the drying apparatus used in the second step to obtain a dry pigment. In order to carry out the first step and second step consecutively in this order, the wet pigment discharge port of the drying apparatus used in the first step is connected by a line to the wet pigment feed port of the drying apparatus used in the second step. However, by arranging a hopper for storing wet pigment and a feeder for quantitatively feeding wet pigment discharged from the hopper to the feed port of the drying apparatus used in the second step at an intermediate location in the line, the burden on workers resulting from transferring wet pigment between the drying apparatuses can be reduced.

In order to obtain an intended dry pigment by continuously carrying out the first and second steps without interruption, it is preferable to adjust the operating conditions of the drying apparatuses used in both steps so that the discharge speed of wet pigment in the first step is equal to or approximately equal to the discharge speed at which wet pigment is dried to dry pigment in the second step.

Since the resulting dry pigment cannot be provided for use as a colorant, for example, if the solid component in the form of the pigment ends up decomposing during the course of drying, it is only natural that the upper limit of the drying temperature of the second step be lower than the decomposition temperature of the pigment.

In addition, in the present invention, the temperature in the second step that is higher than the temperature employed in the first step does not refer to a temperature in excess of 150° C. that is the upper limit temperature at which the first step is carried out, but rather refers to a temperature that is relatively higher than the actual temperature selected from a temperature within the temperature range defined in the first step. In the case drying in the first step is carried out at a drying temperature of 70° C., for example, then the drying temperature of the second step refers to a temperature in excess of 70° C., and does not mean that the temperature must exceed 150° C.

However, the difference between the drying temperature in the first step and the drying temperature in the second step is preferably within the range to +60 to +240° C. and particularly preferably within the range of +80 to +180° C. However, it is difficult to achieve such a large difference in drying temperatures with a single drying apparatus, there is little improvement in drying efficiency if this temperature difference is small, and actual benefits are lost even if two drying apparatuses are used in combination.

Furthermore, the drying temperature of the second step in the form of a temperature that is higher than the temperature employed in the first step but lower than the decomposition temperature of the pigment is preferably 155 to 330° C. and particularly preferably 190 to 280° C. Since the pigment is already in the form of a wet pigment having a moisture content within the range of 5 to 30% as a result of going through the first step, drying in the second step is carried out until this wet pigment reaches the state of a dry pigment.

In carrying out the present invention, although the same drying apparatus as used in the first step may be used in the second step as well and the two apparatuses may be used in parallel while pulverizing in the second step, carrying out the drying of the present invention by using the optimum combination of drying apparatuses in the first and second steps enables drying to be carried out while consuming as little energy as possible, while also making it possible to enhance productivity of the dry pigment, thereby making this preferable. From this viewpoint, it is preferable to use an air flow drying apparatus for the continuous hot air drying apparatus in the second step.

This air flow drying apparatus refers to a drying apparatus designed to capture and recover only pigment particles in which moisture content has been reduced by releasing from the top of a vertical drying tube using the force of hot air concurrent to the hot air in opposition to gravity while retaining only pigment particles having a higher moisture content in the drying tube by releasing hot air from the bottom of the drying tube and loading pigment of an arbitrary form into the air flow thereof.

Although pigment particles having a higher moisture content are dried while being blown upward at the top of the drying tube during the course of drying, if the moisture content of the pigment particles remains high, the particles end up dropping to the bottom of the drying tube due to gravity in opposition to the concurrent flow of the hot air. These particles are then dried by again being blown upward to top of the drying tube. This apparatus is preferably used by adjusting the inflow and discharge of hot air. Hot air can also be used repeatedly until it becomes saturated with water vapor.

A classification unit is preferably provided in the top of the drying tube to enable capturing and recovery of only dry pigment having a particle diameter within a desired range. This classification unit is provided with a blade capable of classifying particles having a required particle diameter. Rotating a classification unit composed of a rotor provided with this type of blade makes it possible to efficiently recover only dry pigment having a particle diameter within a required range.

In addition, a pulverizing unit is provided in order to prevent pigment particles having a higher moisture content from being deposited in clumps in the bottom of the drying tube, and this pulverizing unit is preferably made to cause pigment having a higher moisture content to continuously be blown upward within the drying tube in the form of particles.

Although this pulverizing unit may employ any type of mechanism, examples of such include a disk-shaped rotor provided with a plurality of projections, and a disk-shaped rotor provided with a plurality of blades. As a result of rotation of this disk-shaped rotor, the pigment to be dried contacts the projections or blades causing it to be pulverized by the impact force thereof and thereby preventing the pigment from being deposited and aggregating on the rotor. In addition, swirling flow can also be generated within the drying tube as a result of rotation of the rotor. Swirling flow inside the drying tube increases the higher the rotating speed of the rotor.

Therefore, by allowing a classification unit composed of a rotor provided with a mesh and a pulverizing unit composed of a disk-shaped rotor provided with projections or blades to synchronously rotate, concurrent flow of hot air from the bottom to the top of a drying tube in a steady state is transformed into a large swirling flow within the drying tube that spirals upward to the top of the drying tube. Whereupon, since pigment is dried while being broken up even while present in the air flow, drying efficiency can be further improved in comparison with drying dependent upon concurrent flow of hot air. In addition, this is also preferable since adhesion of pigment to the inner walls of the drying tube accompanying drying thereof is reduced.

Examples of such air flow drying apparatuses able to be used include an air flow drying apparatus like that used in the example shown in FIG. 2 to be described later, and an air flow drying apparatus as described in Japanese Unexamined Patent Application, First Publication No. 2001-41652 or Japanese Unexamined Patent Application, First Publication No. 2004-69115.

There are no particular limitations on the mean particle diameter of dry pigment obtained in the second step of the present invention, and example thereof is a mean particle diameter of 5 to 100 μm. Dry pigment in the form of a powder having a mean particle diameter of 5 to 80 μm is particularly preferable. Furthermore, this mean particle diameter refers to the particle diameter for which the cumulative distribution thereof has a value of 50% in the particle size distribution of a powder of a dry pigment as measured with a laser diffraction particle size distribution analyzer. The definition of a dry pigment in the present invention is as was previously described.

A dry pigment obtained using the production method of the present invention in this manner can be used to color a colored medium, and more specifically, can be used in various coloring applications such as printing ink, paint or molded articles, and in the preparation of inkjet recording ink, electrostatic charge image developing toner or liquid crystal color filters and the like.

The following provides a detailed explanation of the present invention through examples thereof. Furthermore, in the following explanation, parts or percent (%) is based on mass unless specifically indicated otherwise.

In the following explanation, superior productivity in the present invention indicates a high throughput (kg/hr) of dry pigment per unit time in the drying steps.

Although dry pigment throughout varies according to the size of the apparatus, in a typical commercially available apparatus designed in consideration of ease of operation and workability, in the case of a horizontally long type of air-permeable belt drying apparatus, for example, dry pigment throughput when drying presscakes having a moisture content of 60 to 75% at 90 to 130° C. is 70 to 200 kg/hr, while in the case of a spray drying apparatus, dry pigment throughput when drying a pigment slurry having a moisture content of 85 to 90% at a hot air temperature of 320° C. and at an exhaust hot air temperature of 110° C. is 70 to 150 kg/hr.

In addition, energy consumption in the present invention refers to the different amounts of energy in the drying steps converted to an amount of crude oil (liters), and a smaller converted amount of crude oil indicates a smaller amount of energy consumption required for drying.

The energy source for carrying out drying differs according to the drying apparatus used, and examples thereof include LNG, electric power, steam, LPG and city gas. Therefore, in order to quantitatively evaluate energy consumption without being affected by differences in the type of energy source, in the present invention, each amount of energy unique to the apparatus required for drying was evaluated after converting to crude oil.

Furthermore, the crude oil converted value of each energy source was calculated using the crude oil conversion coefficients indicated below. Overall Energy Statistics (2004 Edition) published by the MITI Research Institute (January 2006) was used as a reference for standard unit calorific values.

LNG: 1.41 L/kg
Electric power: 0.232 L/kwh
Steam: 0.0691 L/kg
LPG: 1.30 L/kg

EXAMPLE 1

Figure 1:
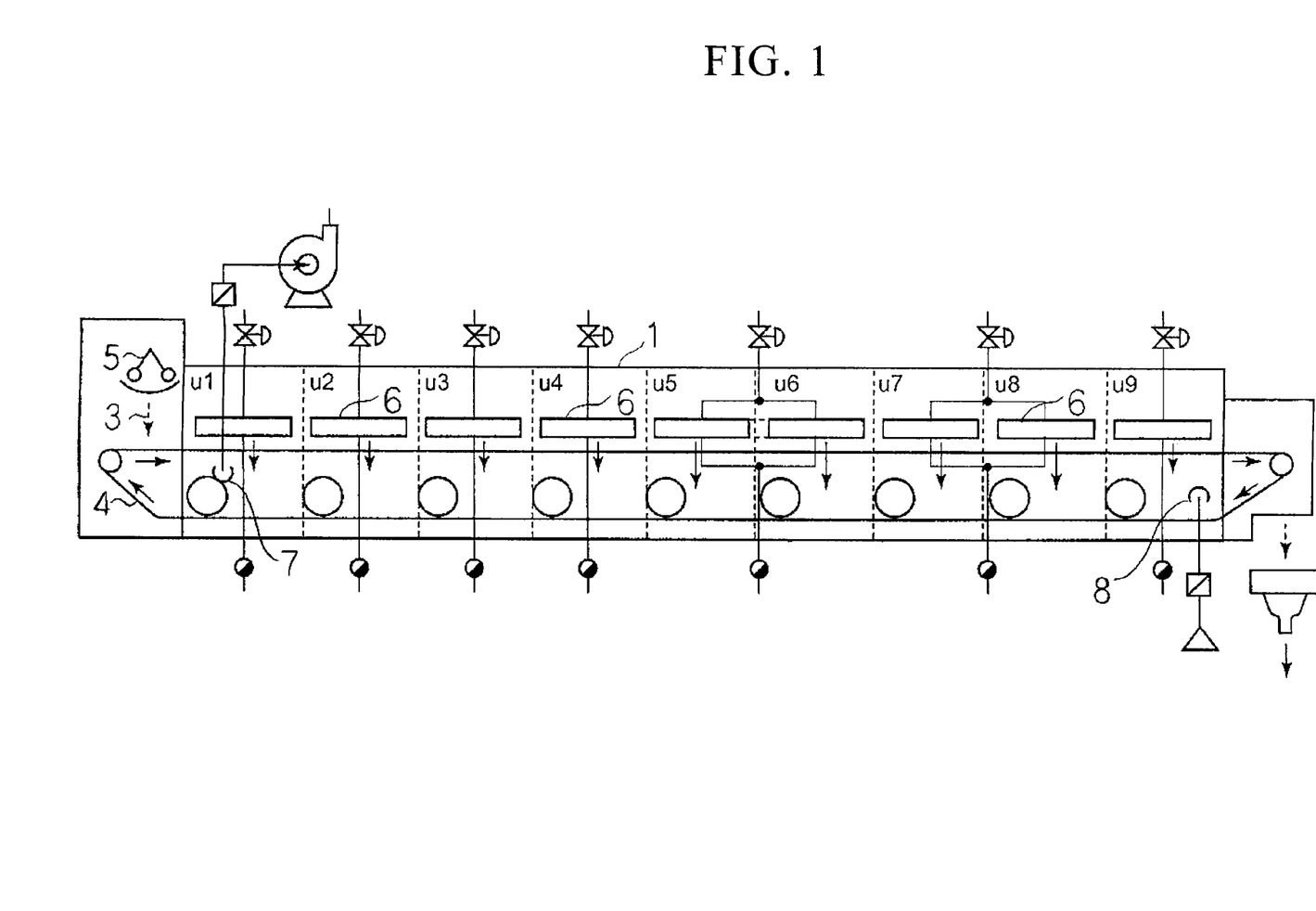
FIG. 1 is a cross-sectional view of an air-permeable belt drying apparatus having a pulverizing unit and a classification unit used in the second step of an example of the present invention.
Figure 2:
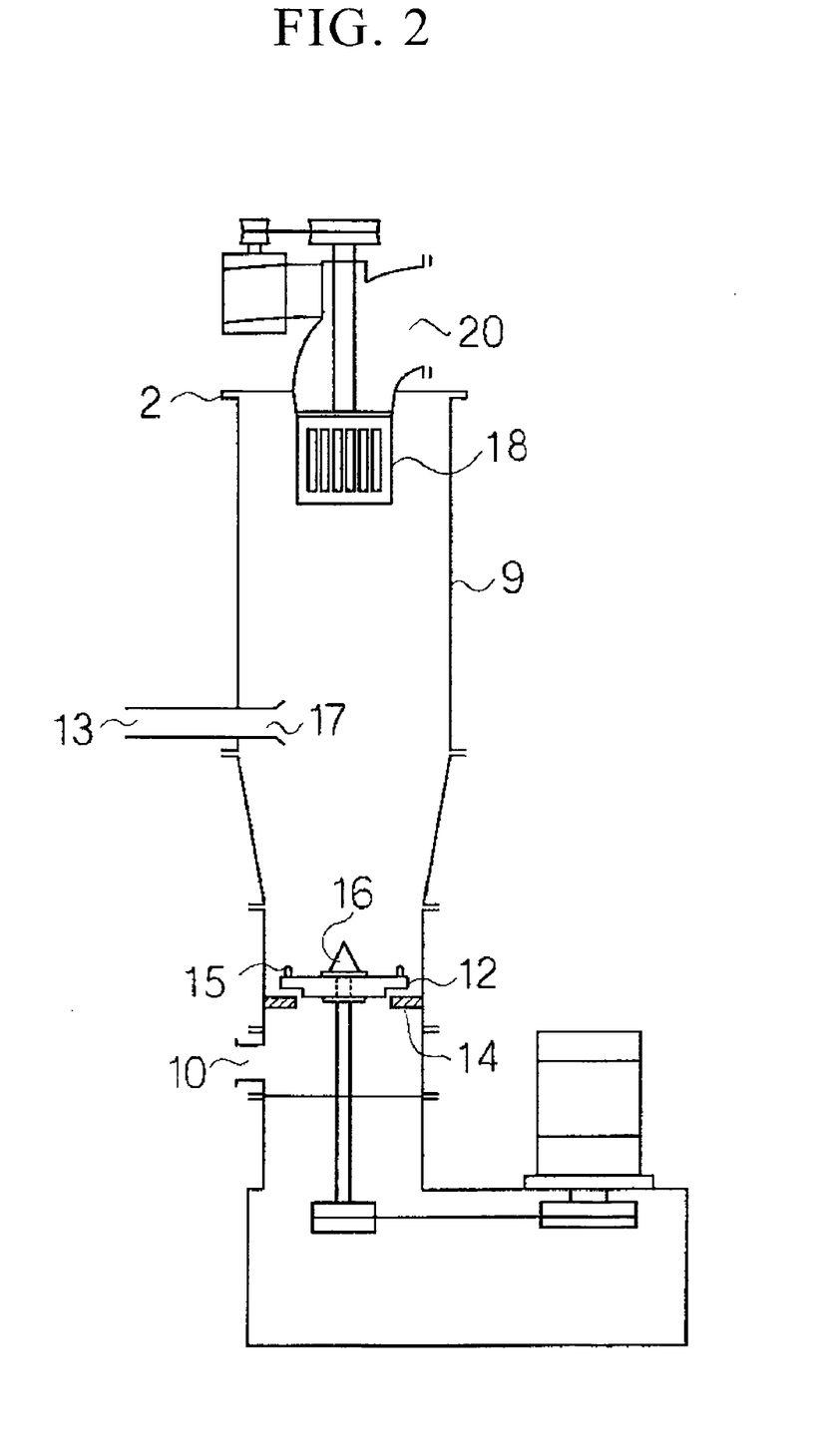
FIG. 2 is a cross-sectional view of an air flow drying apparatus having a pulverizing unit and a classification unit used in the second step of an example of the present invention.

An air-permeable belt drying apparatus 1 used in the first step is shown in FIG. 1, while an air flow drying apparatus 2 used in the step second is shown in FIG. 2. One each of these drying apparatuses was prepared, and although not shown in the drawings, the wet pigment discharge port of the air-permeable belt drying apparatus, a hopper, a screw feeder and the feed port of the air flow drying apparatus were connected in this order so as to be able to carry out the first and second steps of the present invention consecutively.

Furthermore, as shown in FIG. 1, the air-permeable belt drying apparatus 1 is provided with a feed port 3 where presscakes are introduced from the left side as shown in the drawing, and has a band 4 there beneath that transports presscakes from left to right in the drawing in the manner of a belt conveyor. The band movement speed of air-permeable belt drying apparatus 1 is able to be adjusted as necessary. A rolling extruder 5 is provided above presscake feed port 3 that disperses molded presscakes on the band 4, and presscakes are dispersed on band 4 so as not to be dispersed unevenly. In addition, nine chambers represented by reference symbols U1 to U9 are provided on band 4, a heat exchanger unit 6 is provided in each chamber, and although not shown in the drawings, hot air is able to be supplied with a fan towards band 4 there beneath. Temperature inside the chambers is controlled with these heat exchanger units 6 and fans. Each heat exchanger unit 6 is able to regulate the temperature of the supplied hot air. Hot air containing water vapor generated as a result of drying the presscakes can be discharged from an exhaust port 7 provided beneath band 4, while hot air newly heated by each heat exchanger unit 6 is allowed to fill each chamber by taking in outside air from an air supply port 8. Each chamber is connected, hot air is discharged only from the chamber nearest the wet pigment discharge port and outside air is supplied only to the chamber nearest the feed port.

On the other hand, air flow drying apparatus 2 is provided with a housing 9 in which a plurality of cylindrical members are coupled. The inside of housing 9 serves as a drying tube. A wet pigment supply unit 13 of the air flow drying apparatus is provided in the center of the housing, and an inflow port 10 is provided in the lower portion of the housing that takes in hot air supplied by a hot air generation source not shown into the housing 9. In addition, a pulverizing unit in the form of a pulverizing rotor 12 composed of a disk-shaped rotor 11 is provided above inflow port 10, and this pulverizing rotor 12 is able to be rotated by an external drive source.

As a result of arranging the pulverizing rotor 12 and the hot air inflow path such that flat projecting bars 14 are provided along the circumference of the inner wall of the drying tube inside housing 9 facing towards the inside beyond the outer periphery of pulverizing rotor 12 composed of disk-shaped rotor 11, and the flat surfaces of the projecting bars 14 and the outer periphery of disk-shaped rotor 11 appear to overlap when viewed in a projection plane from above, wet pigment that has dropped beyond the outer periphery of disk-shaped rotor 11 is prevented from flowing counter to the direction of inflow port 10 or immediately obstructing inflow port 10 even though hot air is able to pass through towards the drying tube without restriction.

Figure 3:
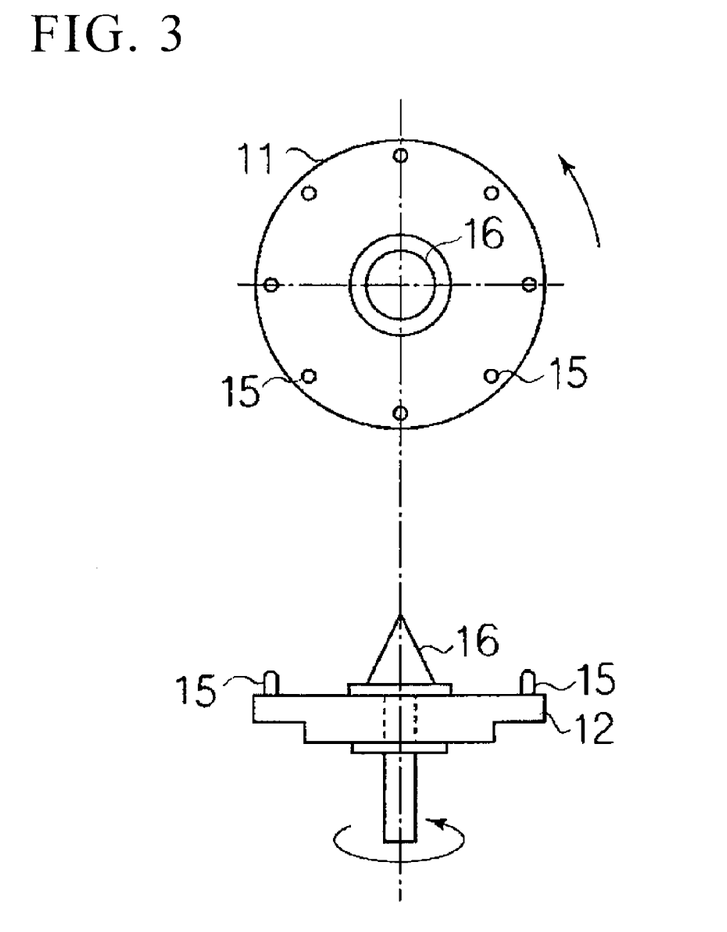
FIG. 3 is an overhead view and cross-sectional view of a pulverizing unit of an air flow drying apparatus used in the second step of an example of the present invention.

Pulverizing rotor 12 is composed of a disk-shaped rotor 11 provided with eight projections 15 at fixed intervals along the circumference thereof as shown in the upper overhead view of FIG. 3 and a triangular pyramid-shaped projection 16 in the center as shown in the lower cross-sectional view of FIG. 3. As a result of this pulverizing rotor 12 rotating and the wet pigment contacting the projections 15, the pigment is pulverized due to the impact force thereof. In addition, wet pigment that has dropped onto the center of the pulverizing rotor 12 is forcibly moved in the circumferential direction by triangular pyramid-shaped projection 16, which together with preventing deposition of the wet pigment, allows wet pigment to be dried while being broken up as a result of being able to be easily blown upward from the center by hot air released from inflow port 10.

A feed unit 13 is provided above the pulverizing rotor 12 for supplying wet pigment. This supply unit 13 is provided with a screw feeder not shown, and allows wet pigment stored in a hopper similarly not shown to drop onto pulverizing rotor 12 after being fed from feed port 17.

Figure 4:
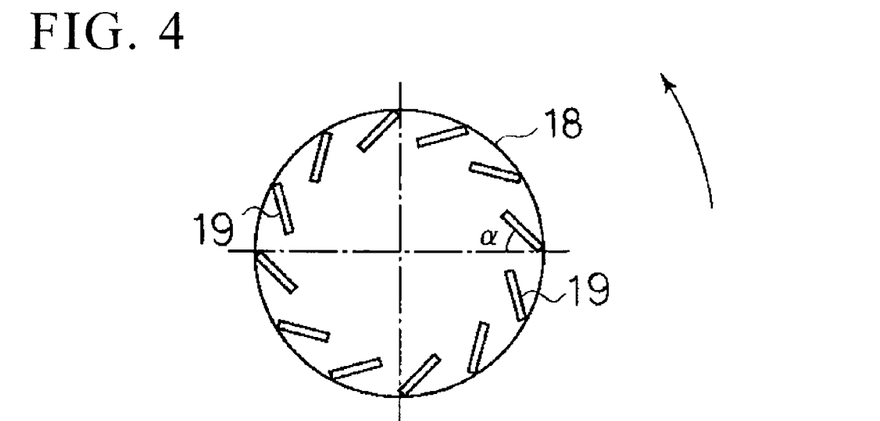
FIG. 4 is an overhead view of a pulverizing unit of an air flow drying apparatus using in the second step of an example of the present invention.

In addition, as shown in FIG. 2, a classification unit 18 is provided in the upper portion of the drying tube of housing 9 for classifying dry pigment. As shown in the overhead view of FIG. 4, this classification unit 18 has a plurality of classification blades composed of thin plates 19 provided vertically in a radiating pattern, and is able to be rotated by an external drive source. The classification blades composed of thin plates 19 are arranged by inclining such that angle α relative to the center line is 45° as shown in FIG. 4.

As a result, together with suppressing the rotating speed of the classification blades, entrance of dry pigment into classification unit 18 is restricted. In addition, an exhaust duct 20 provided above classification unit 18 allows dry pigment to be discharged together with air and water vapor after being suctioned by a blower not shown.

In addition, the rotating classification blades generate swirling flow. Dry pigment that has risen to the vicinity of the classification unit is subjected to centrifugal force generated by this swirling flow. Dry pigment that has become lighter due to discharge of air and water vapor is also subjected to centripetal force that causes it to be suctioned into classification unit 18. Since inadequately dispersed wet pigment has larger centrifugal force, it is thrown outside classification unit 18, drops down and is sent to the pulverizing unit where it is further exposed to hot air.

Since dry pigment that has been dried as a result of being further broken up is subjected to greater centripetal force, it enters classification unit 18 from gaps between the classification blades. Thus, only dry pigment having a uniform particle diameter is obtained as a result of being discharged from the exhaust port of exhaust duct 20.

Furthermore, wet pigment discharged from the discharge port of the air-permeable belt drying apparatus is immediately introduced into the air flow drying apparatus, and the operating conditions of each drying apparatus are adjusted so that wet pigment does not accumulate at the discharge port of the air-permeable belt drying apparatus, thereby allowing dry pigment to be obtained by consecutively carrying out the first and second steps of the present invention in this order. Arrows in each of the drawings indicate the directions of rotation or flow.

After carrying out a first drying step with the air-permeable belt drying apparatus shown in FIG. 1 on 1850 kg of a pigment presscake (moisture content: 70%) obtained by filtering and rinsing a suspension containing C.I. Pigment Red 57:1 synthesized using a known method, the resulting wet pigment was subjected to a second drying step using the air flow drying apparatus shown in FIG. 2 to obtain 554 kg of a dry pigment of C.I. Pigment Red 57:1.

(Operating Conditions of Air-Permeable Belt Drying Apparatus)
Moisture content of supplied pigment presscake: 70%
Hot air temperature controlled with heat exchanger: 110° C. for all units U1 to U9
Moisture content of wet pigment removed from discharge outlet: 8.1%
Wet pigment productivity: 319 kg/hr
(Operating Conditions of Air Flow Drying Apparatus)
Supplied wet pigment: Wet pigment obtained in step 1 (moisture content: 8.1%)
Supply speed of wet pigment from inflow port: 330 kg/hr
Hot air temperature at inflow port: 230° C.
Hot air temperature at discharge port: 110° C.
Pulverizing rotor rotating speed: 4000 rpm
Classification blade rotating speed: 1800 rpm
Dry pigment productivity: 304 kg/hr Thus, a dry pigment obtained by drying by going through first and second drying steps in this manner had a moisture content of 0.7% and mean particle diameter of 10 µm.

COMPARATIVE EXAMPLE 1

1850 kg of a pigment presscake (moisture content: 70%) was obtained by filtering and rinsing a suspension containing C.I. Pigment Red 57:1 synthesized in the same manner as Example 1. A pigment slurry diluted to a moisture content of 88% was dried under the following conditions with the SD-100R-S1 Spray Dryer (continuous spray drying apparatus) manufactured by Niro Japan Co., Ltd. to obtain 554 kg of a dry pigment powder. Furthermore, in this drying apparatus, drying cannot be carried out from the state of a presscake as in Example 1.

(Operating Conditions of Continuous Spray Drying Apparatus)
Moisture content of supplied pigment slurry: 12%
Hot air temperature: 320° C.
Discharged hot air temperature: 110° C.
Dry pigment productivity: 79 kg/hr The dry pigment obtained by carrying out spray drying in this manner had a moisture content of 0.8% and mean particle diameter of 6 µm.

COMPARATIVE EXAMPLE 2

1850 kg of a pigment presscake (moisture content: 70%) were obtained by filtering and rinsing a suspension containing C.I. Pigment Red 57:1 synthesized in the same manner as Example 1. After drying under the following conditions equivalent to conventional conditions so as to obtain a dry pigment in the same manner as Example 1 using only the air-permeable belt drying apparatus used in Example 1, the resulting dry pigment was pulverized to obtain 554 kg of a dry pigment powder.

(Operating Conditions of Air-Permeable Belt Drying Apparatus)
Moisture content of supplied pigment presscake: 70%
Temperature of each unit: U1-U4: 130° C., U5-U9: 110° C.
Dry pigment productivity: 120 kg/hr The dry pigment obtained by carrying out conventional drying using only an air-permeable belt drying apparatus in this manner had a moisture content of 0.9% and mean particle diameter of 9 µm.

COMPARATIVE EXAMPLE 3

Drying was carried out under the following conditions using the same air flow drying apparatus as used in Example 1 on 1850 kg of a pigment presscake (moisture content: 70%) obtained by filtering and rinsing a suspension containing C.I. Pigment Red 57:1 synthesized using a known method to obtain 554 kg of a dry pigment powder of C.I. Pigment Red 57:1. Moreover, the resulting pigment was placed on the shelves of the RXH-32 (box-type drying apparatus) manufactured by Chang Zhou Shuang Hua Drying Equipment Co., Ltd. and heated for 4 hours at 85° C.

(Operating Conditions of Air Flow Drying Apparatus)
Moisture content of supplied pigment presscake: 70%
Supply speed of wet pigment from feed port: 93 kg/hr
Hot air temperature: 270° C.
Hot air temperature at discharge port: 110° C.
Pulverizing rotor rotating speed: 4000 rpm
Classification blade rotating speed: 1800 rpm
Dry pigment productivity: 28 kg/hr The dry pigment obtained by carrying out drying by combining an air flow drying apparatus and box-type drying apparatus in this manner had a moisture content of 0.8% and mean particle diameter of 18 µm.

Furthermore, even in the case of carrying out the same procedure as Comparative Example 3 with the exception of not carrying out drying with a box-type drying apparatus, dry pigment productivity remained considerably inferior to that of Example 1. In addition, the converted amount of crude oil used to indicate energy consumption as described later in this case was considerably larger than that of Example 1.

First, when the dry pigment productivities of Example 1 and Comparative Examples 1, 2 and 3 are represented as the yield of dry pigment per unit time, the dry pigment productivity of Example 1 can be seen to be far superior to the dry pigment productivities of Comparative Examples 1, 2 and 3.

In addition, the amount of energy (steam, electric power, LPG) consumed in the drying steps was measured for Example 1 and Comparative Examples 1, 2 and 3 and converted to equivalent amounts of crude oil. Those results are shown in Table 1.

TABLE 1

(Energy Consumption and Converted Amounts of Crude Oil of Drying Steps)

| Table 1 | Amount of steam used (kg) | Amount of electric power used (kwh) | Amount of LPG used (kg) | Total converted amount of crude oil (L) |
|---|---|---|---|---|
| Example 1 | 1369 | 517 | 0 | 215 |
| Comp. Ex. 1 | 0 | 466 | 389 | 611 |
| Comp. Ex. 2 | 3469 | 291 | 0 | 308 |
| Comp. Ex. 3 | 2562 | 3180 | 0 | 916 |

TEST EXAMPLE 1

6 g of dry pigment powder of C.I. Pigment Red 57:1 obtained in Example 1 or Comparative Example 1, 2 or 3 (to be referred to as pigment), 39 g of lithographic printing ink containing rosin-modified phenol and 5 g of diesel oil were first dispersed for 5 minutes with two rollers and then dispersed by making three passes through 3 rollers using a three-roller rolling machine manufactured by Buhler Co., Ltd. at a temperature of 40° C. and compression pressure of 15 bar to prepare pseudo lithographic printing ink (lithographic printing ink prior to containing a dryer).

(Coloring Strength)

0.2 g of each pseudo lithographic printing ink and 2.0 g of white ink containing titanium oxide were mixed to prepare light-colored ink. The ink was evaluated using the Gretag SPM50 (Gretag Limited spectrophotometer). The coloring strengths of the inks of Example 1, Comparative Example 2 and Comparative Example 3 were expressed numerically based on a value of 100 for the coloring strength of the pseudo lithographic printing ink of Comparative Example 1.

Next, the dispersibility of the pigment in the ink and the transparency of images colored with the ink were evaluated using each of the pseudo lithographic inks Those results are shown in Table 2. The methods used to evaluate dispersibility and transparency and the evaluation criteria are as indicated below.

(Dispersibility)

The dispersibility of each of the pseudo lithographic inks was evaluated using a grind gauge.

⊚: Particularly good
○: Good
Δ: Somewhat good
x: Inferior (Transparency)

⊚: Particularly good
○: Good
Δ: Somewhat good
x: Inferior

TABLE 2

(Lithographic Printing Ink Characteristics)

Production Method of Corresponding Pigment Used

|  | Coloring Strength | Transparency | Dispersibility |
|---|---|---|---|
| Example 1 | 102 | ○ | ○ |
| Comp. Ex. 1 | 100 | ○ | ○ |
| Comp. Ex. 2 | 100 | ○ | ○ |
| Comp. Ex. 3 | 99 | ○ | ○ |

INDUSTRIAL APPLICABILITY

According to the production method of the present invention, in a method for drying by applying stepwise thermal hysteresis to an article to be dried, since initial drying is completed at a comparatively low temperature while still damp dry followed by drying at a higher temperature while pulverizing, a drying pigment can be produced that enables printing ink to be prepared having coloring strength, transparency and dispersibility equal to that of the prior art while consuming less energy than in the prior art and demonstrating superior productivity.

The invention claimed is:

1. A method for producing dry organic pigment, comprising the successive steps of, in this order:
    a first step wherein a wet organic pigment is obtained by drying an organic pigment presscake at 70 to 150° C. to a moisture content of 5 to 30%, and a second step wherein a dry organic pigment is obtained by pulverizing and drying the wet organic pigment at a temperature that is higher than the temperature employed in the first step but lower than the decomposition temperature of the organic pigment.

2. The method for producing dry organic pigment according to claim 1, wherein the first step is carried out with a batch type hot air drying apparatus or air-permeable belt drying apparatus, and the second step is carried out with a vertical air flow drying apparatus having a pulverizing unit.

3. The method for producing dry organic pigment according to claim 1, wherein the organic pigment is an azo pigment.

4. The method for producing dry organic pigment according to claim 1, wherein the organic pigment is a soluble azo pigment.

* * * * *